United States Patent
Hansson et al.

(10) Patent No.: US 8,385,949 B2
(45) Date of Patent: Feb. 26, 2013

(54) METHOD, CALL SETUP DEVICE AND COMPUTER PRODUCT FOR CONTROLLING AND SETTING UP CALLS WITH REDUCED COSTS

(75) Inventors: Mattias Hansson, Bromma (SE); Jorgen Steijer, Älvsjö§ (SE)

(73) Assignee: Opticaller Software AB, Gothenburg (SE)

( * ) Notice: Subject to any disclaimer, the term of this patent is extended or adjusted under 35 U.S.C. 154(b) by 0 days.

(21) Appl. No.: 13/161,390

(22) Filed: Jun. 15, 2011

(65) Prior Publication Data

US 2011/0244854 A1  Oct. 6, 2011

Related U.S. Application Data

(63) Continuation of application No. 11/883,291, filed on Sep. 13, 2007, now Pat. No. 7,996,013.

(30) Foreign Application Priority Data

Feb. 1, 2005 (SE) ........................................ 0500239

(51) Int. Cl.
  *H04W 4/00* (2009.01)
  *H04M 5/00* (2006.01)
(52) U.S. Cl. .................................. 455/461; 379/256.01
(58) Field of Classification Search .................... 379/52, 379/265.01, 114.02, 88.01; 455/445, 413, 455/417, 557; 370/338, 466
See application file for complete search history.

(56) References Cited

U.S. PATENT DOCUMENTS

| | | | |
|---|---|---|---|
| 5,515,425 A * | 5/1996 | Penzias et al. | 379/114.02 |
| 6,421,425 B1 * | 7/2002 | Bossi et al. | 379/52 |
| 6,542,475 B1 * | 4/2003 | Bala et al. | 370/271 |
| 6,823,197 B1 | 11/2004 | Chen et al. | |
| 6,993,360 B2 | 1/2006 | Plahte et al. | |
| 2002/0132638 A1 | 9/2002 | Plahte et al. | |
| 2004/0072593 A1 | 4/2004 | Robbins et al. | |
| 2004/0208307 A1 * | 10/2004 | Walker et al. | 379/265.01 |

FOREIGN PATENT DOCUMENTS

WO  02/078368 A2  10/2002

* cited by examiner

*Primary Examiner* — Kiet Doan
(74) *Attorney, Agent, or Firm* — Birch, Stewart, Kolasch & Birch, LLP

(57) ABSTRACT

A method, call setup device (10) and computer program product for controlling telephone call setup for an associated user and having access to different communication networks are provided. The call setup device (10) comprising a data receiving unit (52) receiving a first data message (DM1) from the user comprising callee identifying information and user identifying information and a control unit (48) having access to call placing units (12, 14, 58), each connected to corresponding network (24,32) and providing telephone call set up via these networks, wherein the control unit analyses the callee and user identifying information, orders a call placing unit to set up a first telephone call to a user terminal, orders a call placing unit to set up a second telephone call to a callee terminal and orders an interconnection of the first and the second call.

16 Claims, 7 Drawing Sheets

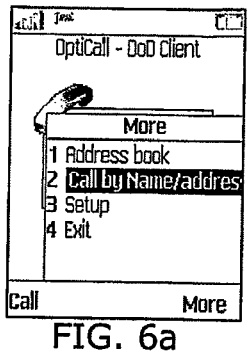
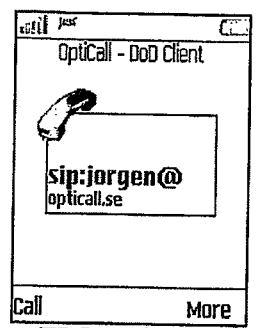
FIG. 6a  FIG. 6b
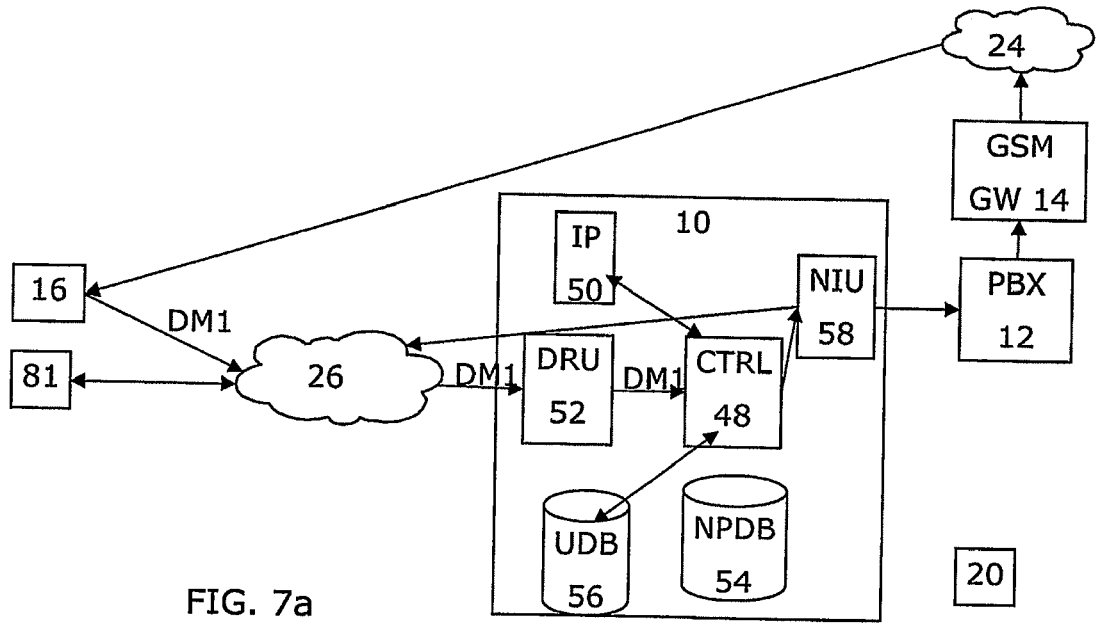
FIG. 7a
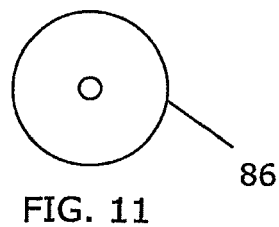
FIG. 11

METHOD, CALL SETUP DEVICE AND COMPUTER PRODUCT FOR CONTROLLING AND SETTING UP CALLS WITH REDUCED COSTS

CROSS REFERENCE TO RELATED APPLICATIONS

This application is a Continuation of application Ser. No. 11/883,291 filed on Sep. 13, 2007, now U.S. Pat. No. 7,996,013 which claims priority to Application No. 0500239.9 filed in Sweden, on Feb. 1, 2005. The entire contents of all of the above applications is hereby incorporated by reference.

TECHNICAL FIELD OF THE INVENTION

The present invention relates to the field of telecommunication and more particularly to the field of setting up calls and then preferably with an object of reducing the costs.

DESCRIPTION OF RELATED ART

Many companies of today have a need for reducing the costs. One area where this can be done is within the field of telecommunication. Telephone costs can be very high and then especially international calls and calls via cellular networks. There is thus often a need to lower these costs.

In this respect many operators have nowadays provided differentiated call tariffs, where the tariffs for calls within the same network are normally limited, very small or even non-existing.

Single users of cellular phones can find out the tariffs of a call by sending a data message including a destination phone number, for instance using a GPRS connection, to a call server, which looks up the number and responds with a data message including the tariffs of that particular call. This is a tool for finding out the cost of a call, but it does not lower the actual cost.

One possible way to lower costs is to try to keep a call within a certain network.

In order to do this the company 2N Telekomunickace a.s, has a brand of products called GSM gateways or GSM routers. A GSM gateway is in essence a set of modules having cellular phone communication capabilities, each provided with its own SIM card or subscription in a certain cellular network. This GSM gateway can then be used, for instance in combination with a PBX (Private Branch Exchange), for placing calls. Once a terminal of the PBX is to place a call to a cellular phone, this call is placed via the GSM gateway that uses a module having a subscription to the same network as the called phone. Because of the types of subscriptions existing today this means that that call can be placed at a very low cost. This is of great advantage when lowering the costs for calls going out from a company exchange.

However in many instances the employees of a company are not working in close proximity of such a GSM gateway or the company premises. It would then be of interest to also lower the costs of calls when the employee wants to make connection to another party or callee from outside of a company premises and then also reduce the costs considerably.

WO 02/978368 describes a system that is mainly intended for providing private branch exchange functionality to a mobile phone. This system can also be used for reducing the above mentioned call costs in some degree. Here a user of a mobile phone can send a data message to a mobile branch exchange that is connected to a private branch exchange. When the user of the mobile phone wants to make a phone call he first sends a data message to the mobile branch exchange including information for contacting the other party. The user thereafter calls the private branch exchange. The mobile branch exchange then orders the private branch exchange to set up a call to the other party and the two calls are then interconnected in the Private Branch Exchange. In this way the company has control of the connection, but also the tariffs between the private branch exchange and the called party can be kept low. However there are here costs associated also with the connection between the cellular phone and the private branch exchange that it would be advantageous to lower.

There is thus a need for a different call set up scheme and especially one that allows further cost reductions.

SUMMARY OF THE INVENTION

The present invention is directed towards solving the problem of providing an improved call set up scheme and especially one that allows further cost reductions.

One object of the present invention is thus to provide a method of controlling the setting up of telephone calls, which provides an improved call setup scheme and especially one that allows further cost reductions.

According to a first aspect of the present invention, this object is achieved by a method of controlling the setting up telephone calls for a user associated with a call setup device, where the call setup device has access to at least one communication network, comprising the steps of:
  receiving, callee identifying information as well as user identifying information via at least one first data message sent by the user,
  analysing the callee identifying information and user identifying information,
  determining a preferred call setup scheme for setting up a call between the callee and the user based on said analysis,
  ordering a call placing unit to set up a first telephone call to a terminal of the user according to the preferred call set up scheme,
  ordering a call placing unit to set up a second telephone call to a terminal of the callee according to the preferred call set up scheme, and
  ordering the interconnection of the first and the second call.

Another object of the present invention is directed towards providing a call setup device for controlling the setting up of telephone calls, which provides an improved call setup scheme and especially one that allows further cost reductions.

According to a second aspect of the present invention, this object is achieved by a call setup device for controlling the setting up of telephone calls for an associated user and having access to at least one communication network, comprising
  at least one data receiving unit arranged to receive at least one first data message from the user comprising callee identifying information as well as user identifying information, and
  a control unit having access to at least one call placing unit, each connected to at least one corresponding network and arranged to set up telephone calls via the corresponding network, said control unit being arranged to:
    analyse the callee identifying information and user identifying information,
    determine a preferred call setup scheme for setting up a call between the callee and the user based on said analysis,
    order a call placing unit to set up a first telephone call to a terminal of the user according to the preferred call set up scheme, order a call placing unit to set up a second telephone call to a terminal of the callee according to the preferred call set up scheme, and order an interconnection of the first and the second call.

Yet another object of the present invention is to provide a computer program product, cost reductions.

According to a third aspect of the present invention this object is achieved by a computer program product for controlling the setting up of telephone calls for a user associated with a call setup device having access to at least one communication network via a corresponding call placing unit, comprising:

computer program code, to make the call set up device execute, when said program code is loaded in the call set up device:

receive, callee identifying information as well as user identifying information via at least one first data message received from the user, analyse the callee identifying information and user identifying information, determine a preferred call setup scheme for setting up a call between the callee and the user based on said analysis, order a call placing unit to set up a first telephone call to the terminal of the user according to the preferred call set up scheme, order a call placing unit to set up a second telephone call to a terminal of the callee according to the preferred call set up scheme, and order interconnection of the first and the second call.

The invention has the following advantages. It enables a more cost efficient way of making calls between terminals in different networks. When calls are made between terminals in different operator's networks, an interconnection fee is normally added to the cost of the call. Using the present invention it is possible to cut the interconnection fee from the call cost. By analysing the callee identifying information, the invention furthermore ensures that the correct networks are used directly for the connection and thus ensures said cost reductions. The invention can also be integrated with existing PBX (Public Branch Exchange) systems and also provide for mobile to fixed phone connectivity in a cost efficient way. Another benefit with the invention is that it also provides for a centralized cost control function when calls are set up from a server rather than from the mobiles. It's possible to define different rules and limits for different users and for example only allow some users to make International calls. The invention thus provides a control of all calls made from a user terminal.

BRIEF DESCRIPTION OF THE DRAWINGS

The present invention will now be described in more detail in relation to the enclosed drawings, in which.

DETAILED DESCRIPTION OF EMBODIMENTS

The invention is directed towards setting up of telephone calls in relation to a user terminal in order among other things enable cost control.

Figure 1:
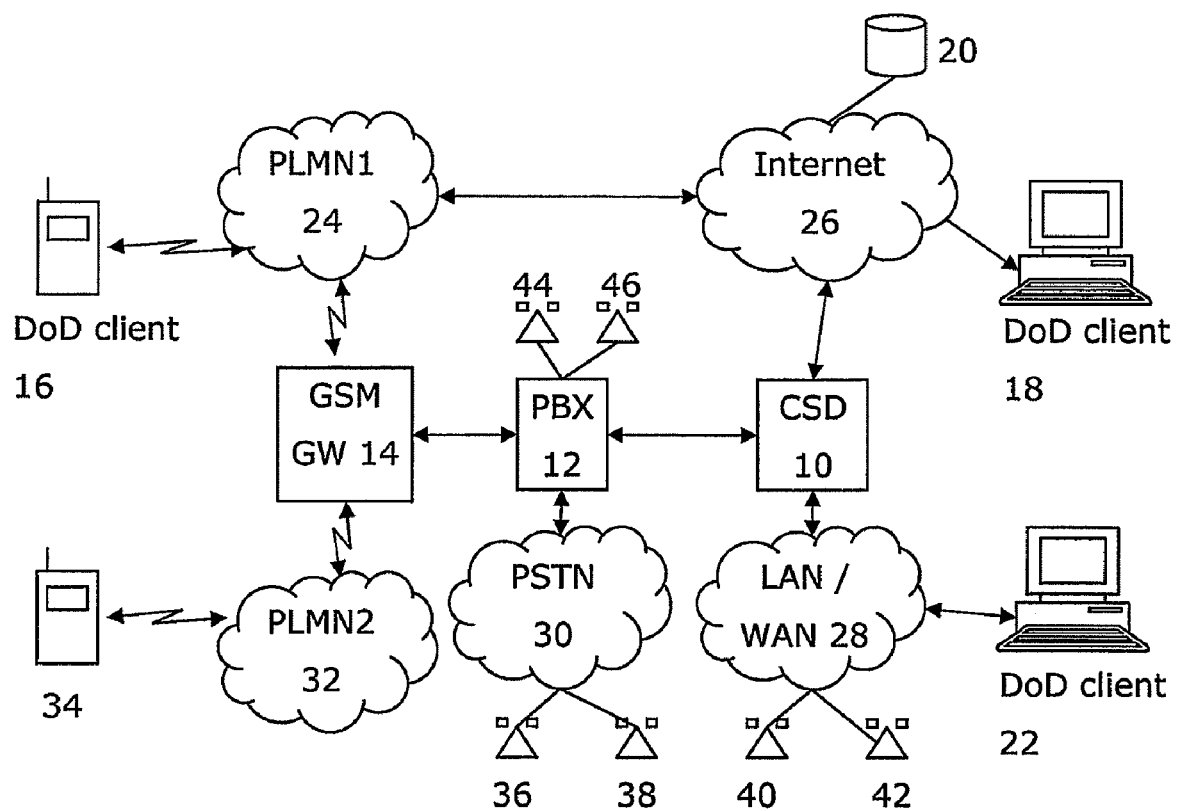
FIG. 1 shows a block schematic of a local network connected to a number of public networks as well as to a number of user terminals.

FIG. 1 schematically shows a number of devices and networks. In the centre of FIG. 1 there is provided a call setup device 10, which is connected to a private branch exchange 12 and to a GSM gateway 14. The call setup device 10 is furthermore connected to a local LAN/WAN network 32. The PBX 12 has a number of extensions of which two 44 and 46 are shown, while the LAN/WAN network 28 has a number of extensions 40, 42 connected to it. The GSM gateway 14, the PBX 12 with extensions, the call setup device 10 and the LAN/WAN network 28 together form a local network that can be provided in the same premises. It can also be envisioned that the local network can be distributed and be provided in several premises and therefore the network can include several PBXs, LAN/WANs as well as several GSM gateways and call setup devices. In the drawing there are a number of other devices shown. The GSM gateway 14 has connections to two or more of the cellular networks of the region where the premises are located, and here to a first and a second cellular network 24 and 32. In order to do this the GSM gateway has subunits in the form of GSM-radio modules associated with each network, where there is at least one subscription or SIM-card associated with each such unit and the different PLMN operators. The GSM Gateway 14 thereby enables the possibility to set up speech calls within each operators PLMN. The PBX 12 is furthermore connected to a Public Switched Telecommunication Network (PSTN) 30, while the call setup device 10 is connected to the Internet 26. To the Internet 26 there is also connected a ported number server 20, which may be a NQuire or SNPAC number portability database. It should however be realised that some other similar type of portability database service might be provided instead. The local network can get connected to a number of terminals, and especially telephone calls can be set up to these terminals, where one such terminal that can be reached is a cellular terminal 34 that is shown as being connected to the second cellular network 32, while two stationary terminals 36 and 38 are being shown as connected to the PSTN 30. Finally a number of terminals associated with clients of the call setup device 10 are shown in the figure. A first user terminal 16 in the form of a cellular phone connected to the first cellular network 24 is shown, as well as a second user terminal 18 in the form of a computer connected to the internet. Finally a third user terminal in the form of a computer 22 is shown as being connected to the local LAN/WAN network 28.

Figure 2:
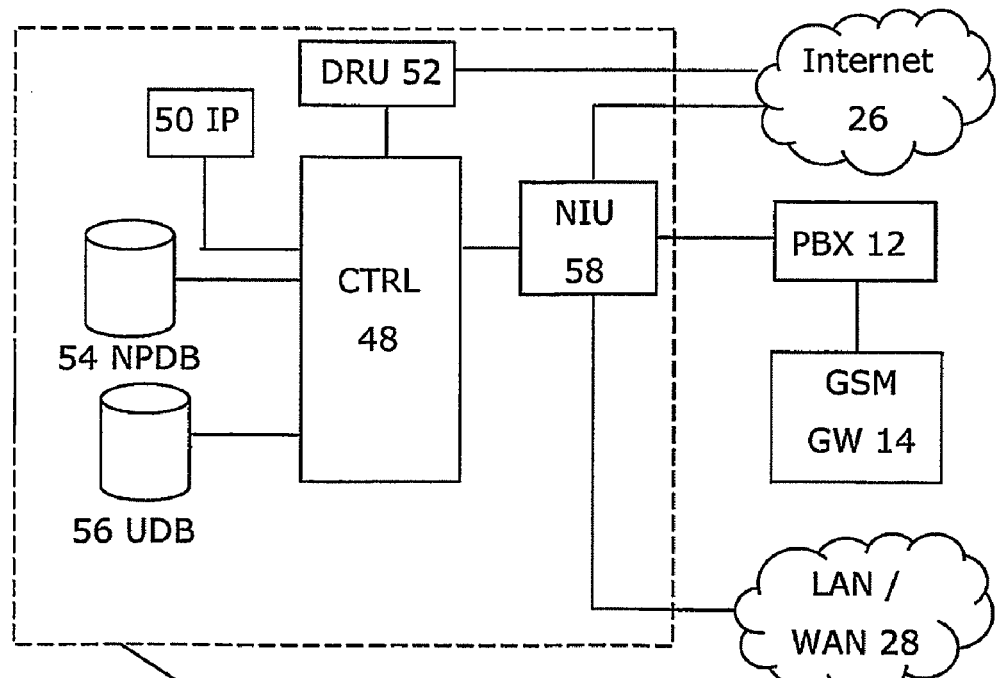
FIG. 2 shows a block schematic of a call setup device according to the present invention connected to some devices of the local network.

FIG. 2 shows a block schematic of the various parts of the call setup device 10. The device 10 includes a control unit (CTRL) 48, a data message receiving unit (DRU) 52, a network interface unit (NIU) 58 for connection to the LAN/WAN network 28, the PBX 12 and the Internet 26, an IP user identity store (IP) 50, a number portability database (NPDB) 54 and a user database (UDB) 56. The device 10 is furthermore communicating with the GSM gateway 14 via the PBX 12. The device 10 communicates with the GSM-Gateway 14 and the PBX 12 using a PRI (Primary Rate Interface) ISDN (Integrated Service Digital Network) connection. Also the PBX 12 is communicating with the GSM-Gateway 14 using a PRI (Primary Rate Interface) ISDN (Integrated Service Digital Network) connection. The data message receiving unit 52 is provided as an interface to the Internet and has a public IP address so that the clients can connect to it over a TCP/IP connection. The call setup device 10 is furthermore running on a LINUX based desktop PC. It should be realised that these are just examples of protocols and platforms to use and that other types of platforms and protocols can be used instead.

In a first variation of the present invention a user terminal is provided as a cellular phone. According to the first embodiment of the present invention, this user terminal has access to a GPRS network provided via the first cellular network. It should also be realised that GPRS is just an example of a packet based network that can be used. Other packet based networks like UMTS might also be used. The user terminal is connected to the PLMN (Public Land Mobile Network), which thus provides speech communication as well as data connections to the Internet.

Figure 3A:
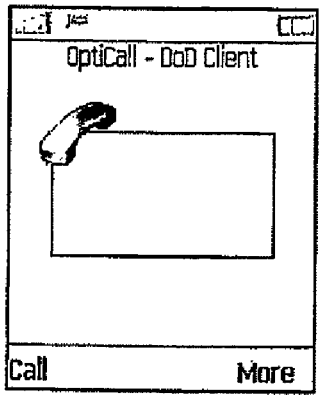
FIG. 3a-3h show a number of screens presented on a user terminal for allowing a user to place a call according to a first embodiment of the present invention.
Figure 3B:
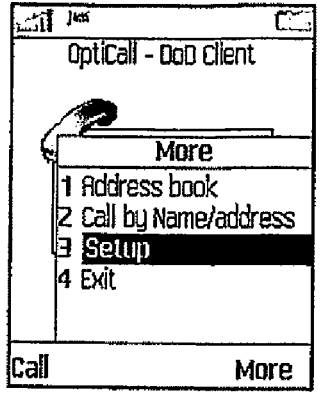
Figure 3C:
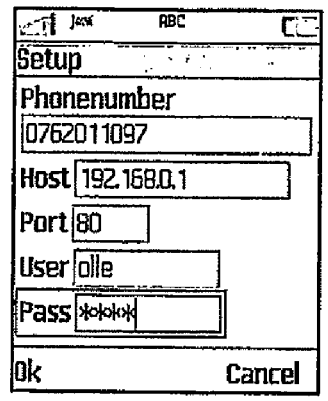
Figure 3D:
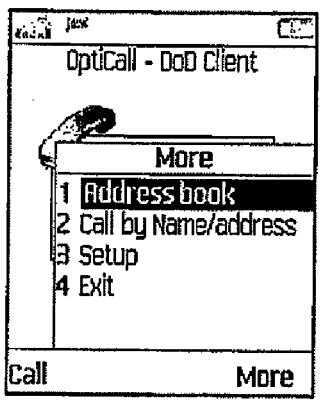
Figure 3E:
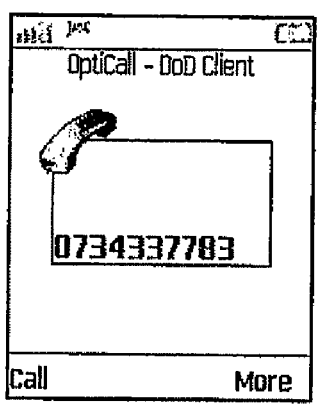
Figure 3F:
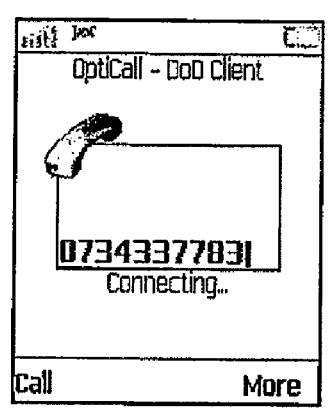
Figure 3G:
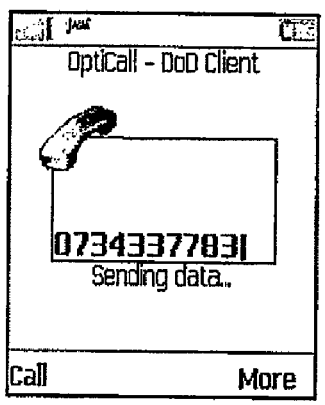
Figure 3H:
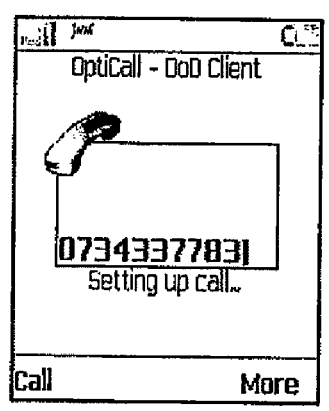
Figure 4:
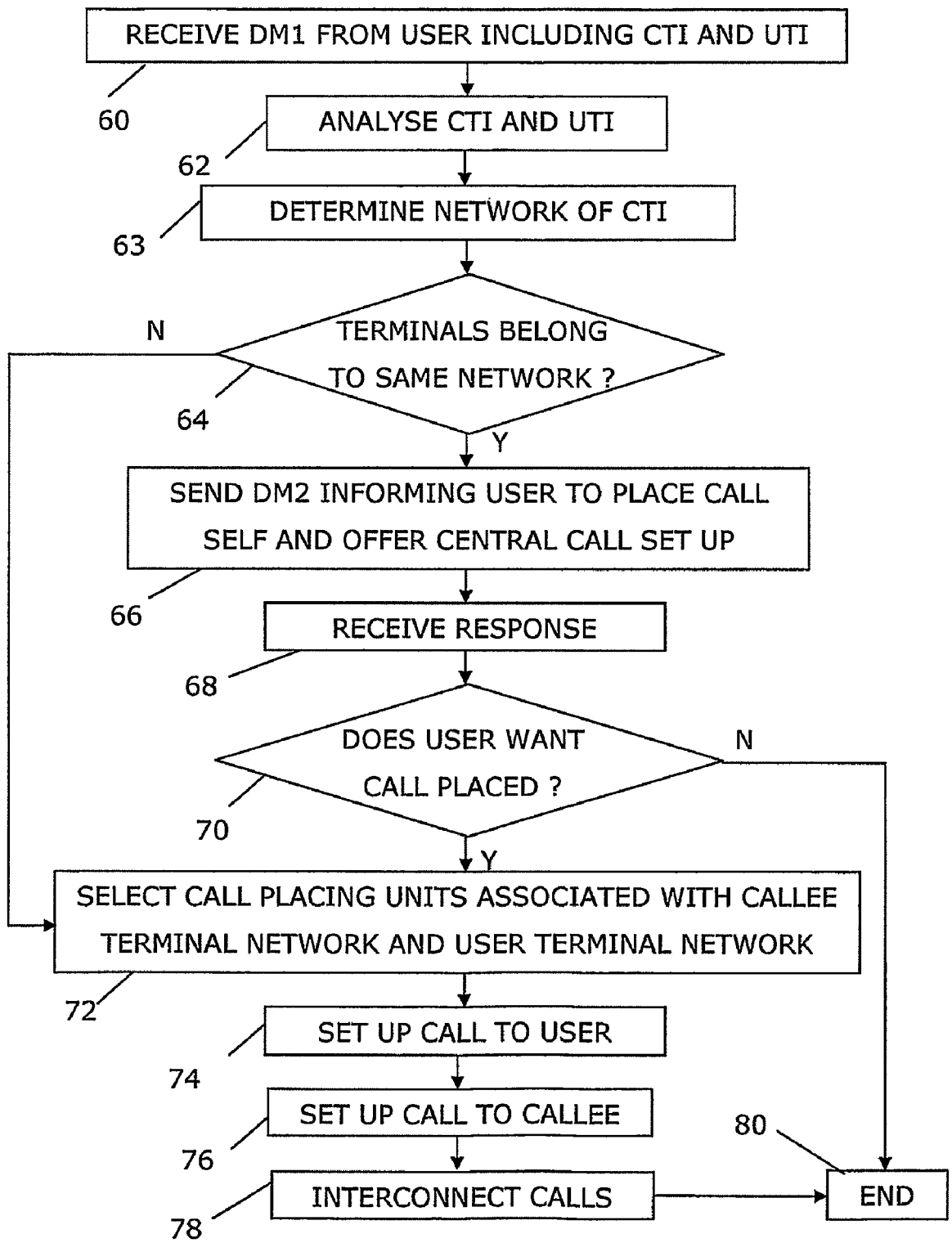
FIG. 4 shows a flow chart of a method of setting up a connection provided in the call setup device according to the present invention, FIGS. 5a and b outline how a connection is being set up via the devices of the local network according to the first embodiment, FIGS. 6a and b show a number of screens presented on a user terminal for allowing a user to place a call according to a second embodiment of the present invention, FIGS. 7a and b outline how a connection is being set up via the devices of the local network according to the second embodiment, FIGS. 8a and b show a number of screens provided on a user terminal for allowing a user to place a call according to a third embodiment of the present invention.
Figure 5A:
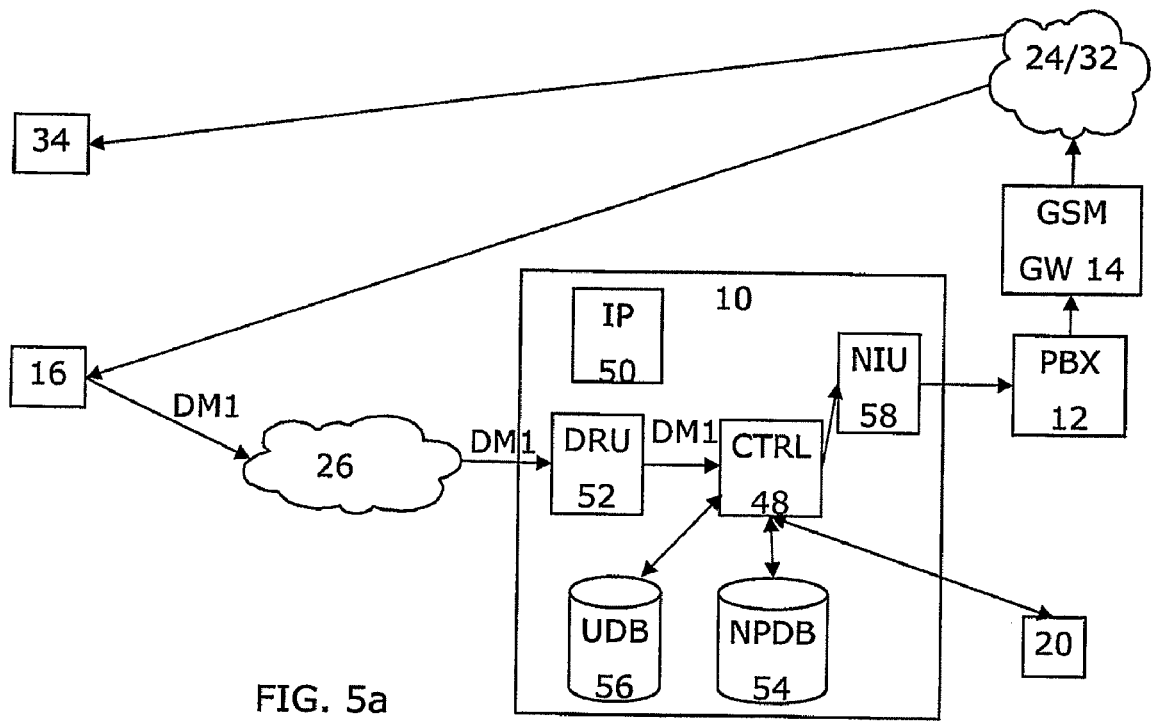
Figure 5B:
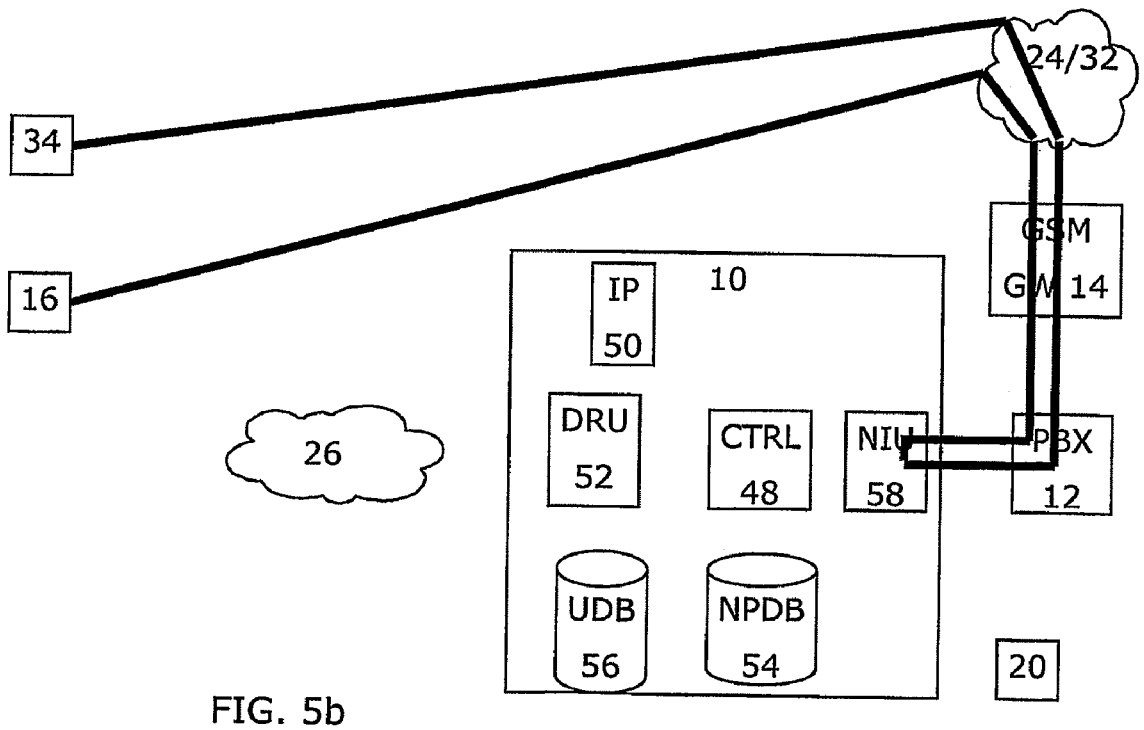

A first, presently contemplated preferred embodiment will now be described with reference being made to the previously mentioned FIGS. 1 and 2, together with FIGS. 3, 4, 5a and 5b, where FIG. 3a-f show a number of screens presented to the user of the user terminal according to this first embodiment, FIG. 4 shows a block schematic of a method according to this first embodiment of the present invention, FIG. 5a outlines how a call set up is initiated and FIG. 5b shows a call that is in progress and has been set up according to the first embodiment.

The user terminal 16 is provided with a special call set up application, which is a java application running on a java compatible cellular phone.

A user of the user terminal 16 is associated with the local network, and more particularly the user terminal, or rather the subscription associated with the user terminal is also associated with the local network. Because of this the local network has knowledge about the tariffs associated with the user terminal and this knowledge is more particularly provided in the control unit 48 of the call setup device 10. The local network can furthermore be the local network of a consultancy firm, having a PBX 12, the LAN/WAN 28, the GSM gateway 12 and call setup device 10 located in their premises. The user terminal, which is here the cellular phone 16, is at the time located outside of the premises. It is first assumed that the user of this user terminal 16 wants to make a phone call to a contact, which contact is here also denoted callee, where this phone call can be to a terminal of the same network, to a terminal of another cellular network, a call to a terminal in the PSTN, a call to a terminal that is a computer, a call to a terminal in some other network or a call to a terminal inside the local network. The callee terminal in the local network can furthermore be either a stationary terminal, a cordless terminal or a computer terminal, i.e. one having an IP address. The callee can thus be reached at any type of terminal. In the first described embodiment, the callee terminal is a cellular phone 34. For this reason the terminal 16 is provided with a special call application, which is here also denoted a DoD (Dial over Data) client. Before the user can start using the application he has to make some settings. Every time the user starts the application he is presented with the screen shown in FIG. 3a. From there he can access a menu by selecting a presented "more" button. In the menu, which is shown in FIG. 3b, he can select a number of items, "address book", "call by name/address", "setup" and "exit". Before use of the application he thus has to make some settings, which is done by selecting the item setup, which is highlighted in FIG. 3b. He is then presented with the screen shown in FIG. 3c. Here the user enters information like user identifying information, which in this embodiment is a user terminal identifier in the form of the user phone number, as well as an IP address number and a port number for contacting the call setup device 10 via the Internet, a user name and a password associated with the user. Thereafter the application is ready to be used. When the user then wants to make a call, he thus accesses the DoD application stored in the terminal 16, as is shown in FIG. 3a. He then selects the address book in the menu system, which is shown in FIG. 3d. There he can select callee identifying information, which in this embodiment is a callee terminal identifier, that is the number he wants to call, see FIG. 3e. It should here be realised that as an alternative he might enter the callee terminal identifier manually and not select it from an address book. Once the user then selects to "place" this call, the user terminal 16 sets up a data connection to the call setup device 10, which is indicated in FIG. 3f. The connection is here provided in the form of a TCP/IP connection using GPRS (General Packet Radio Service). The phone number of the callee or receiver of the call is then included in at least one first data message DM1 sent from the user terminal to the call setup device 10, which Is indicated in FIG. 3g and also shown in FIG. 5a. This message thus includes the callee terminal identifier or B-number as well as a user terminal identifier, which is here in the form of an A-number of the phone. The message also includes the user name and the password. All this information is furthermore encrypted. The information is preferably transmitted in one packet. It is however possible to send it in more, for instance two packets, where a first packet could include the user name and password and the second the actual call placing information. In this way it is possible for a user to first log onto the call setup device and only try using function of the invention after a successful log on.

Since it is a data message in the GPRS environment, the A-number is automatically included in the data message DM1. The data message DM1 is thus sent from the user terminal 16 to the call setup device 10 via the first cellular network 24 and the Internet 26. The user terminal 16 then waits for a response from the call setup device 10 indicating if the call will be established by the server or if the user should make a traditional call instead.

The first data message DM1 is then received by the data message receiving unit 52 in the call setup device 10, step 60, which message thus includes the callee terminal identifier CTI as well as the user terminal identifier UTI of the user terminal 16. This message DM1 is then forwarded to the control unit 48. The control unit 48 first decrypts the message and authenticates the user by comparing the user name and password with corresponding user data in the user data base 56. If the user is authorised by this check, the control unit 48 goes on and analyses the callee terminal identifier and the user terminal identifier, step 62. This is done through forwarding the callee terminal identifier to the number portability database 54, from where information about the network associated with the callee terminal identifier is returned to the control unit 48. This information is not always evident from a look at the callee number, since the user of the callee terminal may have retained his number from a previous subscription using another network. The number portability database 54 has previous knowledge of what network the callee terminal identifier belongs to and if it has no such knowledge or the knowledge that it has is outdated, it can access the external database 20 for retrieving such information. Based on this analysis, the control unit then determines the network the callee terminal belongs to, step 63, and determines a preferred call set up scheme, which is here a least cost routing scheme for the call to be placed.

In the example given here, the subscription of the user terminal 16 is such that for all calls made within the same network the tariffs are reduced, which means that if the callee terminal identifier identifies a terminal associated with the same network as the user terminal, i.e. the first cellular network 24 in this example, step 64, the control unit makes the data message receiving unit send a response message DM2 indicating that the user may place the call himself, but the call setup device 10 still offers to set up the call, step 66. The control unit 48 then awaits a response that is to be received within a certain time limit. In case no response is received or a negative response is received, step 70, the method is ended, step 80, and the call setup device 10 assumes that the user sets up the call himself. In case the callee terminal did not belong to the same network, step 64, or the user wanted a call to be placed through the help of the call set up device 10, the control unit 48 then goes on and orders the network interface unit 58 to place a call to the user terminal 16, step 74, as well as to the callee, step 76, where the correct network of the callee as well as of the user is indicated. In the present example, this was the case. The network Interface unit 58 then sends a request to call the A-number or user terminal to the GSM gateway (via the PBX). After the first call is accepted by the user at the user terminal the network interface unit 58 then sends a request to the GSM gateway 14 (via the PBX 12) to set up a call to the callee terminal 34. When the second call is accepted by the callee the network interface unit 58 interconnects the two calls, step 78, and the method is ended, step 80. In order to collect call statistics the call setup device may furthermore keep track of the calls during the complete duration of the connections. During the set up of the actual call the user is presented with the information in FIG. 3h. The path the two calls take and how they are interconnected is also evident from FIG. 5b. Here the GSM gateway 14 acts as a call placing unit, since it is the unit placing the actual calls.

In the case of the user terminal 16 setting up the call itself, the application in the user terminal can be set to automatically set up this call on reception of the second data message DM2.

In this way the call set up device has set up a call between the user and the callee and made sure that the call is set up such the costs are as low as possible. It should however be realised that there are other situations where the user terminal might be allowed to set up a call, for instance in dependence of the structure of the tariffs of the subscription or depending on rules set for the user in the call setup device. Another reason can be that there is much traffic to and from the local network, i.e. a congestion situation. Thus the user terminal informs the call setup device of which callee terminal it wants to reach and the call setup device analyses this information and rules set up for the user terminal and decides call setup scheme based on this information. Because many subscriptions in cellular networks are such that tariffs for calls within the network are reduced, the call tariff between the user terminal and the local network is reduced and the call tariff between the callee device and the local network is also reduced. The only additional cost associated with the call is the cost of transmitting the first data message, which is in many cases insignificant compared with the tariff reductions.

There are a number of variations that can be made to the method outlined above. The first data message might not include the password and the user name. Another thing worth mentioning is that the number portability database need not be provided inside the local network. In this case the call setup device will only access the external database. It is furthermore possible to only include the local number portability database. It is also possible that the user terminal does not get notified that the user can set up the call himself, either because the subscription is not of a type where this is cost saving when using the same network or because the company running the call set up device has a policy of letting all calls go through the call set up device. The important thing is that the call setup device analyses the callee terminal identifier and selects which set up scheme that is the most economical one and that the user terminal, if it is allowed to, only gets to set up the call if this actually is the most economic way. In all other cases the call set up device sets up all the connections needed. It is furthermore possible that the user terminal is always online with the GPRS network. As an alternative the DoD application in the user terminal of the first embodiment might also be able to automatically start the java client when the user tries to make a call. The DoD application can furthermore be integrated with the phonebook in the user terminal. It can furthermore be arranged to automatically set up the call to the callee itself in case the second data message indicates that the user terminal can set up the call itself.

It is possible to set up a call also to other callee devices than cellular phones. It is for instance possible to set up a call to a callee terminal in another country. In this case the call is normally set up via the PBX through the PSTN, in which case the PBX acts as a call placing unit. It is also possible to set up a call to a stationary terminal in the PSTN or a terminal within the local network for instance to one of the computers in the local LAN network or one of the extensions of the PBX. For this reason the network interface unit has a Voice over IP functionality and can thus also function as a call placing unit.

It is furthermore possible to set up a call to another type of terminal like for instance to a computer on the Internet having a IP telephony application. For this reason the call set up device of FIG. 2 is provided with an IP user identity store 50 associated with identities used by the call set up device in IP telephony sessions, for instance via a service provided on the Internet, like SIP (Session Initiated Protocol), MSN or Yahoo.

Figure 7B:
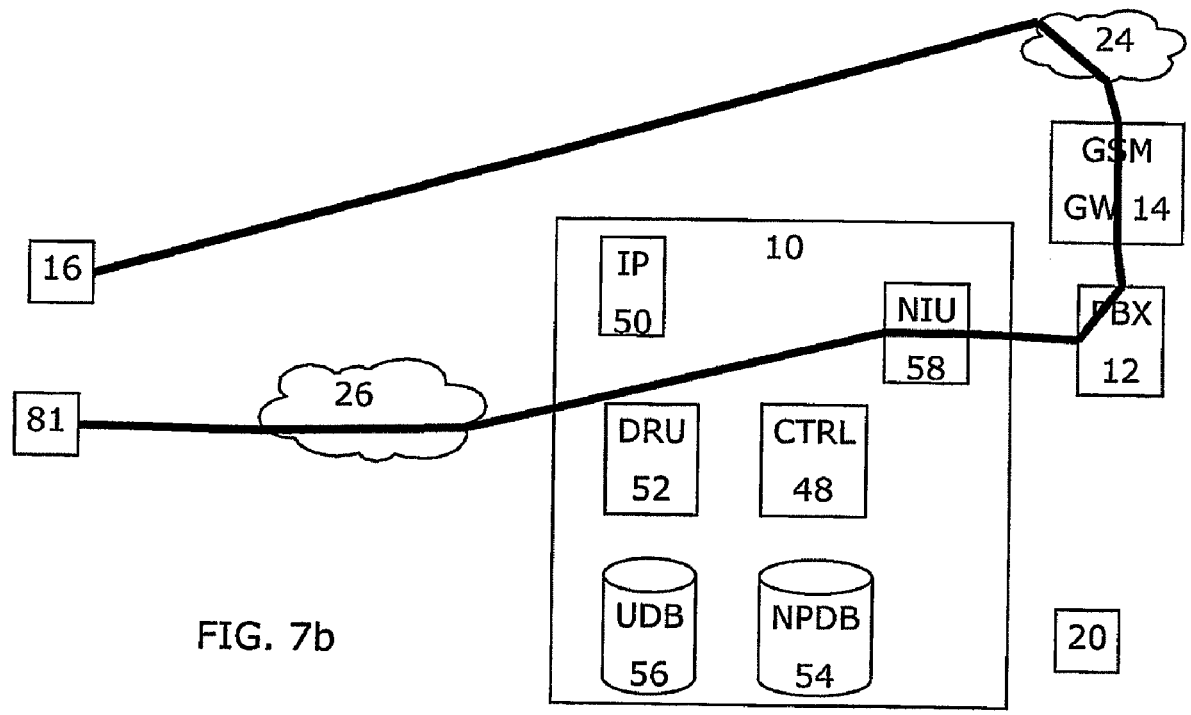

Now a second embodiment of the present invention will be described in relation to FIGS. 6a and b as well as FIGS. 7a and b for a callee terminal that uses Voice over IP via the Internet. Here the user selects the item "call by name/address" in the application menu system, see FIG. 6a, and there enters a terminal identifier of the callee associated with a calling service which is here SIP, see FIG. 6b. This identifier is in the same way sent in at least one data message DM1 to the call setup device 10, see FIG. 7a. There the control unit 48 analyses it, performs authentication and possibly a number portability check, and orders the network interface unit 58 to set up the call according to a least cost routing scheme. Here the network interface unit 58 sets up a call via the GSM gateway 14 as the first call in the same way as in the first embodiment, and thus the GSM gateway acts as a call placing unit. In order to set up the call to the callee terminal, the control unit 48 here fetches an identity of the network to be used for the second call from the IP identity store 50, which is here an identity associated with SIP. This identity is then forwarded to the network interface unit 58, which sets up the second call to the callee terminal via the server of the service using the fetched identity and the Internet 26. The network interface unit 58 thus also acts as a call placing unit. This means that the fetched identity is used as "B-number" for this voice over IP call, while the callee terminal Identifier is used as "A-number". All this is outlined in FIG. 7*a*. Thereafter the calls are interconnected in the same way as in the first embodiment, which is shown in FIG. 7*b*.

It is furthermore possible that the user does not want to or cannot use his cellular phone, if he is at a certain location outside of the company premises or does not bring it with him. According to a second variation of the present invention, the user terminal may be a computer or cellular phone without the DoD application. Two such situations will now be described.

Figure 8A:
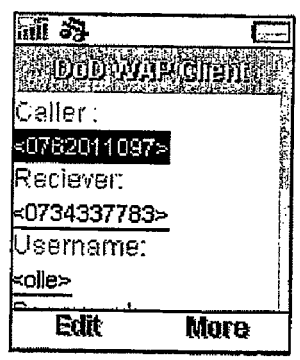
Figure 8B:
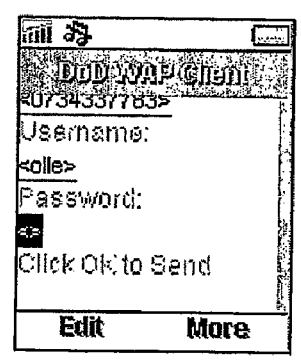

According to a third embodiment of the present invention, the cellular phone of the user uses a WAP (Wireless Application Protocol) function for sending the data message to the call setup device. This can be used if the user does not have a DoD application, but has a WAP browser. Then the user logs onto a WAP server using his WAP browser. From that WAP server he downloads a form, which form is shown in FIGS. 8*a* and 8*b*. In the form the user enters a user terminal identifier in the form of the phone number of the user terminal, the callee terminal identifier, which is here the same as the cellular number used in the first embodiment, together with the user name and a password. The form is then returned to the WAP server via the limited first cellular network, which might be a GSM network, which in turn forwards the form or message to the call set up device. Call set up is then performed in the same way as in the first embodiment.

Figures 9, 10A, 10B:
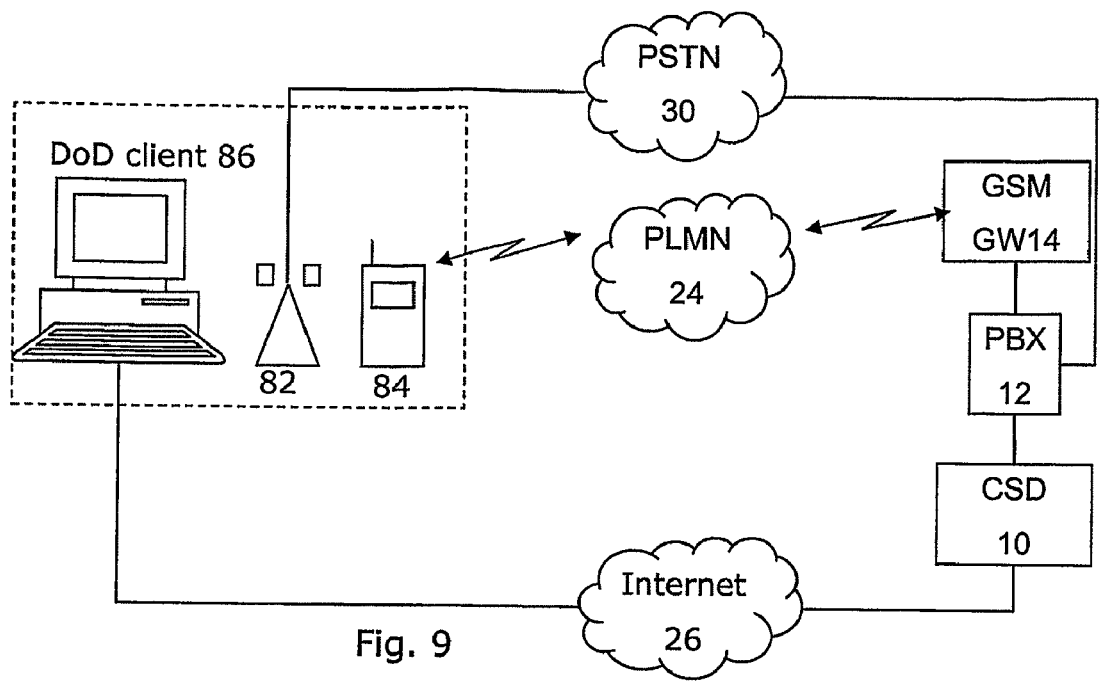
FIG. 9 shows a block schematic of some parts of the local network together with terminals of a user for explaining a fourth embodiment of the present invention, FIGS. 10a and b show a number of screens provided by a web site for allowing a user to place a call according to the fourth embodiment of the present invention, and FIG. 11 schematically shows a computer readable medium in the form of a CD Rom disc comprising computer program code for performing the method according to the invention.

FIG. 9 shows a schematic view outlining a fourth embodiment of the present invention. Here the user terminal 86 is a computer having an Internet connection, with which there is associated a cellular phone 84 and a stationary phone terminal 82 connected to the PSTN. In FIG. 9 the PSTN 30, the first cellular network 24, as well as the Internet 28 is also shown connected to the GSM gateway 14, the PBX 12 and the call setup device 10. In this embodiment of the present invention the call set up device 10 has or has access to a web site associated with the company into which the user can log in using his user name and password, see FIG. 10*a*. Once there, the user can specify a user terminal identity for a terminal he wants to use for the call as well as a callee terminal he wants to call, see FIG. 10*b*. The terminal can either be the cellular phone 84, the stationary phone terminal 82 or even the computer 86, if this computer has phone capabilities. It should here be noted that the cellular phone is In most cases not the same phone as in the first example. Once the user has entered this information on the web site, the call set up device is notified of the requested call, which may be sent in a first data message from this server to the call setup device. The call setup device then analyses, after a check of the password and user name, the identities of the user terminal and the callee terminal. The call set up device thereafter selects a route which is associated with the lowest cost between these two terminals in the same manner as was described above. Here it is possible to also analyse the user terminal identifier in case it is a cellular phone, the number of which has been ported. The user can furthermore provide more than one user terminal identifier and the call set up device may then select user terminal for the call, which may be the one for which the costs are the lowest.

According to yet another embodiment of the present invention, the user might use even simpler callee identifying Information in the form of a callee identifier, for instance a name or some other general information indicating the callee in the first data message. The call set up device would then locate a terminal identifier associated with the callee by for instance accessing the user database 56. The call setup device 10 might then select a terminal with which the costs are the lowest for placing a call. The callee is then preferably a person that is associated with the company. As a possible additional feature related to this scenario it is furthermore possible that the different users of the local network might log themselves to the call set up device and notify it about the terminals where they can be reached at different points in time, like home phone numbers, computers at other premises as well as cellular phones. These users are then possible callees. Once a user wants to place a call to a callee having his/her preferred identities set in this user data base, the call set up device looks in the user database, and selects the callee terminal among these identities that have the lowest call placing costs. The user can here send a name to the call setup device, receive different name alternatives from the call setup device and select one of the names of these alternatives, which selection is sent to the call setup device, whereupon the call setup device places a call to a terminal of the selected callee. The name can for instance be the first name of a presumptive callee and the returned names the full names of local network users having that first name. The functionality can also be applied for the user wanting to place a call, such that the user may provide user identifying information in the form of a user identifier, for instance his user name, and then the call setup device selects a user terminal from a set of user terminals of the user that the user has previously indicated that he can be reached on. The call setup device then preferably selects the one with which the lowest costs are associated.

The units of the call setup device can be provided either as software running on a computer or as hardware components or a combination of software and hardware components. Therefore the invention can be provided In the form of a computer program product, which performs the method of the invention when being loaded into the call set up device. The computer program product can be implemented as software that can be downloaded into the call set up device from a remote location. It can also be provided in the form of a data carrier, for instance a CD ROM disc 86 as is shown in FIG. 10. It should however be realised that other types of data carriers can be used instead.

The present invention is not limited to reducing costs. The invention provides a way to select a preferred call set up scheme based on properties of the user and the callee, which might just as well be based on other factors or rules. It can also be based on the quality of the connection, according to priorities for the user and security measures.

The present invention can be varied in several ways. It is for instance not necessary to use a PBX. The call set up device can for instance communicate directly with a GSM gateway instead. Also the GSM gateway may be omitted. The local network may for instance be very small and can include only the call setup device. The network interface unit is preferably provided as a PBX for allowing interconnection of calls and call set up. It can as a non-limiting example have an ISDN E1 interface (30 channels PRI) for connection to a GSM Gateway or another PBX. It can furthermore be provided outside the call setup device. The network Interface unit does however not have to be a PBX. It can just as well be only an Internet connection. In its simplest form the call set up device is connectable only to the Internet. As an addition it might also be connected to another network, either a cellular network or a PSTN. The first cellular network may furthermore be a UMTS network. The call setup device can further be/include a configuration tool for defining users, rights and limits, cost control and cost limitation rules, statistics and billing.

It is thus possible that the call setup device is a stand-alone unit, which has a connection, for instance via the Internet, to a communication server providing a calling service like SIP or Skype and that thus may be IP-based. In this case there may be only one call placing unit, namely said communication server, which sets up calls between the user and a callee under the control of the call setup device.

The call setup device thus has access to a number of networks which may be as low as one network. The number may also be significantly higher.

The present invention has many advantages. The main purpose of the invention is to enable a more cost efficient way of making calls between terminals in different networks. When calls are made between terminals in different operator's networks, an interconnection fee is added to the cost of the call. Using the present invention it is possible to cut the interconnection fee from the call cost. By analysing the callee identifying information, the invention furthermore ensures that the correct networks are used directly for a call connection and thus ensures said cost reductions. The call setup device can be Integrated with existing PBX (Public Branch Exchange) systems and also provide for mobile- to fixed phone connectivity in a cost efficient way. Another benefit with the invention is that it also provides for a centralized cost control function when calls are set up from a server rather than from the mobiles. It's possible to define different rules and limits for different users and for example only allow some users to make international calls. The invention thus provides a control of all calls made from the user terminal.

The invention claimed is:

1. A method of controlling the setting up telephone calls for a user associated with a call setup device, where the call setup device has access to at least one communication network via a corresponding call placing unit, comprising:
   receiving, by the call setup device, at least one first data packet from a web site associated with the call set up device, said data packet comprising callee identifying information as well as user identifying information comprising a phone number of a terminal of the user, where the callee information and user identifying information have at least partly been entered by the user via a screen provided by the web site after logging in to said web site,
   analysing the callee identifying information and user identifying information, ordering a call placing unit to set up a first telephone call to said cellular terminal of the user,
   ordering a call placing unit to set up a second telephone call to a terminal of the callee based on the callee identifying information, and
   ordering the interconnection of the first and the second call;
   further comprising determining a preferred call setup scheme for setting up a call between the callee and the user based on said analysis, where the ordering of a call placing unit to set up a first telephone call and ordering of a call placing unit to set up a second telephone call are performed based on said analysis,
   wherein the determining of a preferred call set up scheme comprises determining networks via which the connection is to be set up, and
   wherein the determining of a preferred call setup scheme is based on rules regarding network usage provided for said user.

2. The method according to claim 1, further comprising receiving, at the web site, callee information and user identifying information from the user and sending said data packet from the web site to the call set up device.

3. The method according to claim 1, wherein the preferred call set up scheme is a scheme having the lowest tariffs associated with the connection between the user terminal and the callee terminal.

4. The method according to claim 1, wherein the setting up of first and second telephone calls as well as interconnecting these calls are performed if the preferred call set up scheme indicates that the call is to be set up via the local network.

5. The method according to claim 1, further comprising, if the preferred call set up scheme indicates that the call is to be set up directly between the terminal of the user and the callee, sending at least one second data message to the user comprising at least this information.

6. The method according to claim 5, wherein the preferred call set up scheme indicates that the call is to be set up directly between the terminal of the user and the terminal of the callee when the user terminal identifier indicates the same network as the network determined for the callee.

7. The method according to claim 1, wherein the user identifying information comprises a user identifier.

8. The method according to claim 7, wherein the callee identifying information comprises a callee terminal identifier identifying a terminal of the callee.

9. The method according to claim 8, wherein the analysing comprises a ported number investigation of a terminal identifier for identifying the network of the identifier.

10. The method according to claim 7, wherein the callee identifying information comprises a callee identifier.

11. The method according to claim 10, further comprising determining at least one terminal identifier to be used for call set up based on the user and/or callee identifier.

12. The method according to claim 11, wherein the call setup device is provided in a local network.

13. The method according to claim 12, wherein the local network comprises a database of terminal identifiers, where a network user can set which of a number of terminal identifiers to be reached on and the determining a terminal identifier to be used for call set up comprises selecting a terminal identifier set by a network user.

14. An arrangement for setting up calls in relation to a user, said arrangement comprising
   a call set up device for controlling the setting up of telephone calls for the user and having access to at least one communication network, comprising at least one data receiving unit arranged to receive at least one first data packet from an associated web site, said data packet comprising callee identifying information as well as user identifying information comprising a phone number of a terminal of the user, said information having at least partly been entered by the user via a screen provided by the web site after logging in of the user at the web site, and
   a control unit having access to at least one call placing unit, each connected to at least one corresponding network and arranged to set up telephone calls via the corresponding network, said control unit being arranged to:
   analyse the callee identifying information and user identifying information,
   order a call placing unit to set up a first telephone call to a terminal of the user,
   order a call placing unit to set up a second telephone call to a terminal of the callee based on the callee identifying information, and order an interconnection of the first and the second telephone call,
further comprising determining a preferred call setup scheme for setting up a call between the callee and the user based on said analysis, where the ordering of a call placing unit to set up a first telephone call and ordering of a call placing unit to set up a second telephone call are performed based on said analysis,
wherein the determining of a preferred call set up scheme comprises determining networks via which the connection is to be set up, and
wherein the determining of a preferred call setup scheme is based on rules regarding network usage provided for said user.

15. The arrangement according to claim 14, further comprising said web site, said web site being arranged to receive callee information and user identifying information from the user and send said data packet from the web site to the call set up device.

16. A web site associated with a call set up device for controlling the setting up of telephone calls for a user, the call set up device having access to at least one communication network, the web site being configured to:
receive from the user, after logging in at said web site, callee identifying information as well as user identifying information, where at least part of said information has been entered by the user via a screen provided by the web site, and
send at least one first data packet to the call set up device, said at least one data packet comprising said callee identifying information and user identifying information comprising a phone number of a terminal of the user, in order to allow the call set up device to analyse the callee identifying information and user identifying information, arrange the set up of a first telephone call to the terminal of the user, arrange the set up of a second telephone call to a terminal of the callee and arrange the interconnection of the first and the second telephone call,
further comprising determining a preferred call setup scheme for setting up a call between the callee and the user based on said analysis, where the ordering of a call placing unit to set up a first telephone call and ordering of a call placing unit to set up a second telephone call are performed based on said analysis,
wherein the determining of a preferred call set up scheme comprises determining networks via which the connection is to be set up, and
wherein the determining of a preferred call setup scheme is based on rules regarding network usage provided for said user.

* * * * *